(12) United States Patent
Beaujot

(10) Patent No.: US 7,854,205 B2
(45) Date of Patent: Dec. 21, 2010

(54) CHAMBER FOR SLOWING PARTICLES FLOWING IN A PNEUMATIC CONVEYOR CONDUIT

(75) Inventor: Norbert Beaujot, Regina (CA)

(73) Assignee: Straw Track Manufacturing Inc., Emerald Park, Saskatchewan (CA)

( * ) Notice: Subject to any disclaimer, the term of this patent is extended or adjusted under 35 U.S.C. 154(b) by 56 days.

(21) Appl. No.: 12/289,622

(22) Filed: Oct. 30, 2008

(65) Prior Publication Data

US 2010/0107945 A1  May 6, 2010

(51) Int. Cl.
*A01C 7/00* (2006.01)
*A01C 9/00* (2006.01)

(52) U.S. Cl. ..................................... 111/176

(58) Field of Classification Search ............... 11/170, 11/174–185
See application file for complete search history.

(56) References Cited

U.S. PATENT DOCUMENTS

| | | | |
|---|---|---|---|
| 1,327,455 A * | 1/1920 | Willis et al. | 222/41 |
| 5,522,328 A | 6/1996 | Long | |
| 5,934,056 A * | 8/1999 | McMurtry et al. | 56/203 |
| 2002/0088383 A1* | 7/2002 | Barry et al. | 111/181 |
| 2004/0134399 A1* | 7/2004 | Stephens et al. | 111/178 |
| 2004/0134400 A1* | 7/2004 | Thiemke et al. | 111/178 |
| 2004/0244658 A1* | 12/2004 | Conrad et al. | 111/170 |
| 2005/0204971 A1* | 9/2005 | VenHuizen | 111/185 |

* cited by examiner

Primary Examiner—Christopher J. Novosad
(74) Attorney, Agent, or Firm—Nixon & Vanderhye P.C.

(57) ABSTRACT

A chamber apparatus for reducing the speed of particles carried in a pneumatic conveyor conduit includes a chamber with an inlet port in the chamber, the inlet port adapted for attachment to the pneumatic conveyor conduit, and an outlet port in a lower portion of the chamber. A plurality of flexible bristles is secured at ends thereof to a wall of the chamber and extend into the chamber such that particles carried in an air stream entering the inlet port contact the bristles. The chamber is configured such that particles falling inside the chamber move out of the chamber through the outlet port.

17 Claims, 3 Drawing Sheets

Figure 5:
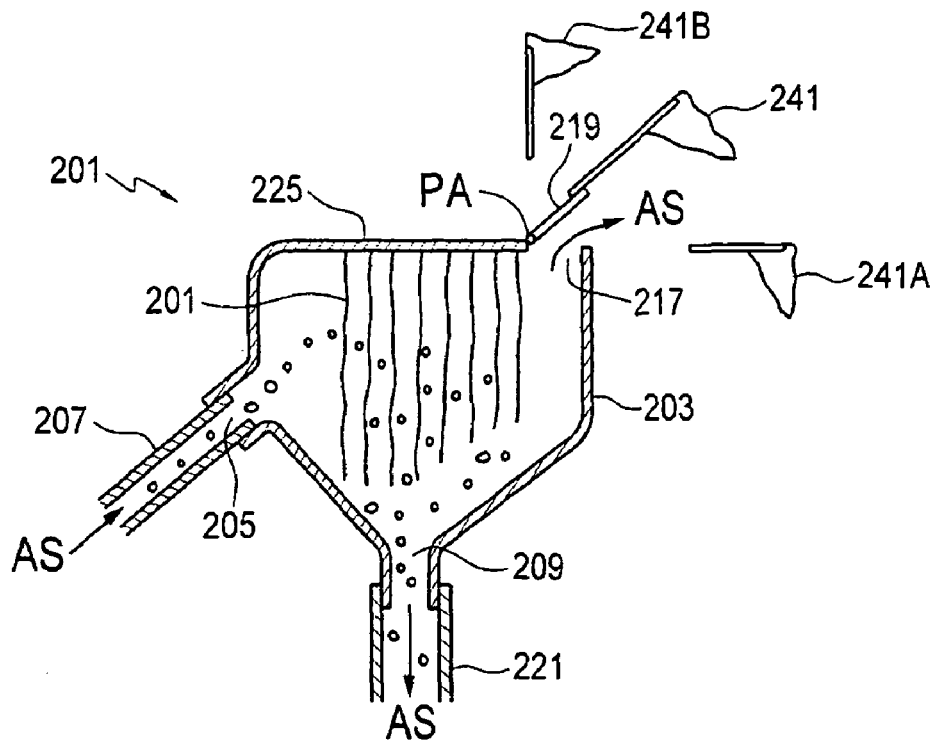

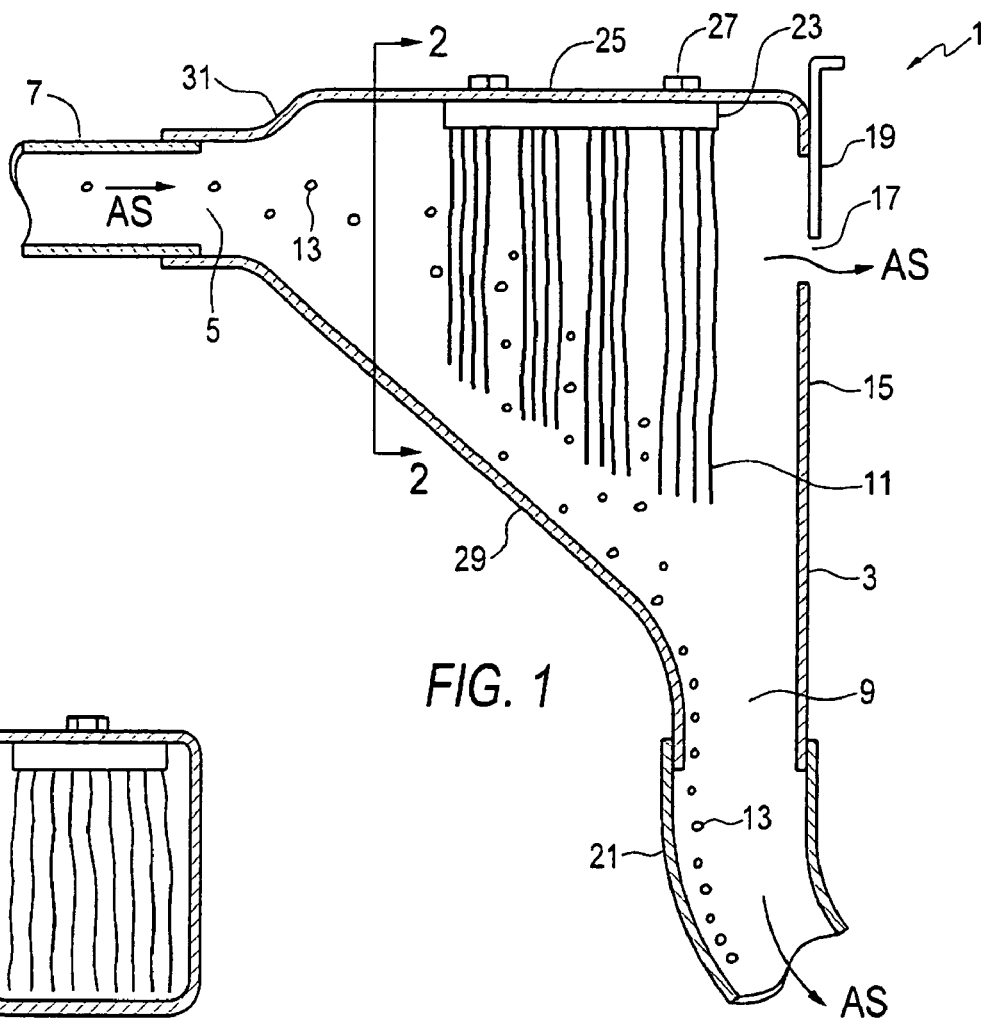
FIG. 1
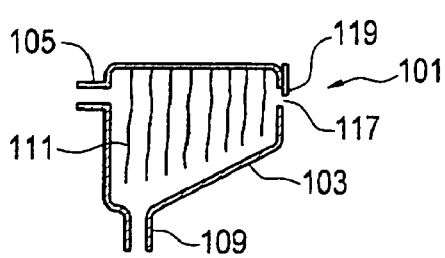
FIG. 2
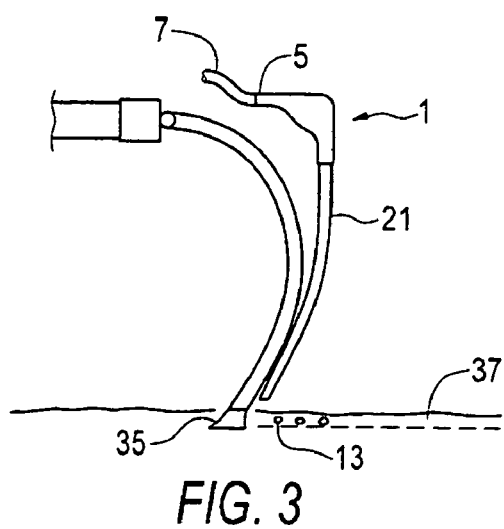
FIG. 3
FIG. 4

CHAMBER FOR SLOWING PARTICLES FLOWING IN A PNEUMATIC CONVEYOR CONDUIT

This invention is in the field of pneumatic conveyors, and in particular pneumatic conveyor such as are used in air seeders where seed and like agricultural products are carried through a conduit by an air stream.

BACKGROUND

Air seeders are well known for seeding agricultural crops. Air seeders typically comprise a frame with furrow openers mounted thereon that are configured to create furrows in a field surface. For best results it is desirable to deposit seed, and other agricultural products such as fertilizer, in the bottom of the furrow. Air seeders include one or more tanks containing agricultural products, a conduit network connected between the tanks and the furrow openers, and a fan to create an air stream flowing from the tanks to the furrow openers. The delivery conduits are connected at their output ends to direct the products into the bottom of the furrows. The air flow must be sufficient to maintain the agricultural products in the air stream. When the air stream is too slow, the product drops out of the air flow and plugs the conduit.

As farmers farm larger tracts of land, air seeders have become wider, and the conduit network longer. Longer conduits require a higher velocity air stream in order to ensure the products are maintained in the air stream. Higher velocities however have detrimental effects on seed placement at the bottom of the furrow. Seeds traveling at high speed out of the output end of a delivery conduit often hit the bottom of the furrow and then bounce up, landing in the looser soil above the bottom of the furrow, or even bouncing completely out of the furrow.

Furrow openers are often further configured to create two or more separate furrows, and to deposit one agricultural product, such as fertilizer into one furrow, and a different product, such as seed, into another furrow. When velocity is excessive the products can often bounce or blow into the wrong location and result in reduced effectiveness.

To address this problem various devices have been developed to slow down the agricultural products before they exit the output end of the delivery conduit, so that the material will drop into the bottom of the furrow and stay there. Air release chambers, also commonly referred to as seed brakes, are available. These seed brakes comprise generally a chamber placed in series in a conduit, typically in proximity to the outlet end thereof, such that the air stream enters the chamber, and air is released through a screen in the chamber walls that prevents the seed from blowing out with the air. Baffles may also be provided in the chamber to further slow the seed as it strikes the baffles. Such a seed brake is available from Dutch Industries Ltd. of Pilot Butte, Saskatchewan, Canada. U.S. Pat. No. 5,522,328 to Long also discloses a similar seed brake with an air release and baffles.

A cyclone type air release chamber is also available where the air stream carrying the agricultural products enter a cyclone which separates the products from the air stream and allows the product to fall down into the trench. Such a device is available from Invenco Pty Ltd. of Sydney, Australia.

In such devices the seed hits the hard surfaces of baffles which can damage the seed, especially sensitive seeds such as peas and bean. The devices also often leave the seed moving at an excessive rate.

SUMMARY OF THE INVENTION

It is an object of the present invention to provide a chamber apparatus for reducing the speed of particles carried in a pneumatic conveyor conduit that overcomes problems in the prior art.

In a first embodiment the present invention provides a chamber apparatus for reducing the speed of particles carried in a pneumatic conveyor conduit. The apparatus comprises a chamber with an inlet port in the chamber, the inlet port adapted for attachment to the pneumatic conveyor conduit, and an outlet port in a lower portion of the chamber. A plurality of flexible bristles is secured at ends thereof to a wall of the chamber and extend into the chamber such that particles carried in an air stream entering the inlet port contact the bristles. The chamber is configured such that particles falling inside the chamber move out of the chamber through the outlet port.

In a second embodiment the present invention provides an air seeder air conduit apparatus comprising a chamber adapted to be mounted above a furrow opener of the air seeder, with an inlet port in a first portion of the chamber and an outlet port in a lower portion of the chamber. An air seeder air conduit is connected to the inlet port such that an air stream carrying particles of agricultural products through the conduit is directed toward a second portion of the chamber. A plurality of flexible bristles are secured at ends thereof to a top wall of the chamber and extend downward into the chamber between the inlet port and the second portion of the chamber such that particles carried in the air stream entering the inlet port contact the bristles. The chamber is configured such that particles falling inside the chamber move out of the chamber through the outlet port, and the outlet port is located such that particles moving out of the outlet port can be directed to fall into a furrow made by the furrow opener.

In a third embodiment the present invention provides a method of slowing the speed of particles carried in an air stream in a pneumatic conveyor conduit. The method comprises directing the air stream into an inlet port in a chamber, and providing an outlet port in a lower portion of the chamber; providing a plurality of flexible bristles secured at ends thereof to a wall of the chamber such that the bristles extend into the chamber and such that particles carried in the air stream contact the bristles and are slowed by the bristles and drop to a bottom of the chamber; configuring the chamber such that particles falling inside the chamber move out of the chamber through the outlet port; and directing particles sliding out of the chamber to a desired location.

In a fourth embodiment the present invention provides an air seeder air conduit chamber apparatus. The apparatus comprises a chamber adapted to be mounted above a furrow opener of the air seeder, with an inlet port in a first portion of the chamber, the inlet port adapted for connection to an air seeder air conduit such that an air stream carrying particles of agricultural products through the air conduit is directed into the chamber, an outlet port in a lower portion of the chamber, and an exhaust port defined in the chamber. The chamber is configured such that particles falling inside the chamber move out of the chamber through the outlet port. A gate is pivotally attached to the chamber about a pivot axis and biased towards a closed position where the exhaust port is substantially covered by the gate such that an air stream directed into the chamber is operative to exert a force on the gate and move the gate from the closed position toward a fully open position and a gate position indicator is operative to indicate to an observer a position of the gate in a range from the closed position to the fully open position. The outlet port is located such that particles flowing out of the outlet port can be directed to fall into a furrow made by the furrow opener.

Thus particles carried in the air stream contact the bristles which flex and slow the particles which finally slow to the point where they drop to the bottom of the chamber, which is sloped so that particles slide through the outlet port at a much reduced speed, and can be directed to a desired location. Thus damage to the particles is reduced since the particles contact the flexible bristles instead of rigid baffles or walls, and the particles dropping out through the outlet port are moving slowly as desired.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a schematic sectional side view of an embodiment of a chamber apparatus of the present invention;

FIG. 2 is a schematic sectional view along line 2-2 in FIG. 1;

FIG. 3 is schematic side view showing the embodiment of FIG. 1 mounted for use on an air seeder;

FIG. 4 is a schematic sectional side view of an alternate embodiment of the invention;

FIG. 5 is schematic cut away side view of an alternate embodiment of the apparatus of the invention, with a gate position indicator on the exhaust port gate;

FIG. 6 is a schematic top view of an array of bristles such as could be used in the embodiments of FIGS. 1, 4, and 5 showing the cupped orientation of the bristles in the direction of flow of the air stream;

FIG. 7 is a schematic cut away side view of an embodiment of the apparatus with a gate indicator that indicates a gate position to a remote observer;

FIG. 8 is a cutaway side view of an alternate apparatus of the invention including a metering mechanism in the bottom of the chamber.

DETAILED DESCRIPTION OF THE ILLUSTRATED EMBODIMENTS

FIG. 1 schematically illustrates a cutaway side view of an embodiment of a chamber apparatus 1 of the present invention for reducing the speed of particles carried in a pneumatic conveyor conduit. The apparatus 1 comprises a chamber 3 with an inlet port 5 in the chamber 3. The inlet port 5 is adapted for attachment to the pneumatic conveyor conduit 7. An outlet port 9 is provided in a lower portion of the chamber 3.

A plurality of flexible bristles 11 are secured at upper ends thereof to the top wall of the chamber 3 and hang down into the chamber 3 such that particles 13 carried in an air stream AS entering the inlet port 5 contact the bristles 11. The bristles 11 are placed across substantially the entire width of the chamber 3 as illustrated in FIG. 2. While it is contemplated that the bristles could extend into the chamber 3 from a side wall, the illustrated orientation provides benefits in that particles fall clear of the mounting location of the bristles 11 where the particles 13 could be caught instead of falling to the bottom of the chamber 3.

Bristle material such as is used in brushes of various kinds is contemplated as being convenient for the purpose, however the bristles 11 can be provided by any flexible elements that can essentially be grouped close enough together to ensure contact with particles 13, and also allow air to move between the bristles 11.

The air in the air stream AS passes through the bristles 11, but the particles 13 are slowed as they contact the bristles 11, and fall to the bottom of the chamber 3, which is configured such that particles 11 falling inside the chamber 3 move out of the chamber 3 through the outlet port 9. As the bristles 11 are flexible, they move when contacted by a particle 13, reducing shattering and cracking of fragile particles. In the illustrated apparatus 1 the chamber 3 is sloped so that particles 13 falling to the bottom slide out through the outlet port 9.

In the illustrated apparatus 1 the inlet port 5 is defined in an upper portion of a front wall of the chamber 3 and is adapted for attachment to the pneumatic conveyor conduit 7 such that the air stream AS entering the inlet port 3 is directed generally horizontally toward the rear wall 15 of the chamber 3. An exhaust port 17 is defined in the rear wall 15 of the chamber 3, and a gate 19 is operative to change a size of the exhaust port 17 to control air flow therethrough. The port 17 may be screened to prevent particles 13 from blowing out through the port 17, however it is contemplated that the bristles 11 will be oriented such that virtually all particles will be stopped by the bristles, and only air will filter through the bristles to the exhaust port 17.

It is to be understood the terms “front” and “rear” are used to indicate relative directions in the apparatus 1. The apparatus 1 may be mounted on an implement moving in an operating travel direction, such as an air seeder, in any convenient orientation.

With the gate 19 partially open as illustrated, a portion of the air stream AS exits the chamber 3 through the exhaust port 17 and a portion of the air stream exits the chamber through the outlet port 9. The exhaust port 17 may not be required in all applications. It is contemplated that the apparatus 1 will be located close to the final destination of the particles 13. In a typical application in an air seeder air conduit, the apparatus 1 will be typically located just above a furrow opener so that the particles 13 can drop through an output conduit 21 and into the furrow. With the particles slowed down and essentially separated from the air stream AS it may be acceptable to have all the air in the air stream exit the chamber through the outlet port alongside the falling particles, since the air flow should not unduly accelerate the particles before they exit the output conduit 21 into the furrow. In such an air seeder application it may also desirable to have air blowing through the output conduit to keep mud and the like from blocking the bottom end of the output conduit 21.

It is contemplated that when the apparatus 1 is used in an air seeder air conduit, the volume and speed of the air stream will vary considerably depending on the application rate and on the agricultural products being carried. Providing the exhaust port 17 allows for different conditions to be addressed, and in any event the gate 19 can be moved to completely close the exhaust port 17 if desired. It is also contemplated that the exhaust port and gate could be configured as illustrated in the apparatus 201 of FIG. 5. The chamber 203 has an inlet port 205 in a first portion at the upper front area of the chamber 203. The outlet port 209 is provided in a lower portion of the chamber 203. An exhaust port 217 is defined in the rear portion of the chamber 203, as illustrated in the top wall 225 rearward of the bristles 211. The illustrated gate 219 is pivotally attached to the chamber about a pivot axis PA, and is biased by the weight of the gate 219 toward a closed position where the exhaust port 217 is substantially covered by the gate. The gate 219 is forced to the illustrated partially open position when an air stream AS enters the chamber 203, and the gate moves more open or more closed as the force of the air stream varies. By changing the weight of the gate 219, the gate 219 will move to different positions between the fully open and closed positions. The gate 219 is thus operative to change the size of the exhaust port 217 that is open for any given air stream, and thereby can control air flow therethrough such that the proportion of the air stream going out the exhaust port 217, and the proportion of the air stream AS going out the outlet port 209 are at the desired proportions. The weight of the gate 219 can be changed by adding or removing small weights that could conveniently be magnets.

An indicator can be connected to the gate 219 to indicate a position of the gate 219 between the closed and fully open positions. The weighted gate 219 of FIG. 5 is illustrated with an indicator being a flag 241 attached thereto to make the position of the gate 219 more readily apparent to an observer. Operation of an air seeder can thus be monitored visually. If airflow to all furrow openers is satisfactory, the flags on all chamber apparatuses 201 will be at about the same level, ie. somewhat open. If an air conduit 207 carrying the agricultural products from the tank of the air seeder to the chamber 203 is plugged, no air stream will be entering the chamber 203 and the gate 219 will fall closed and the flag 241 will be down in position 241A. If the output conduit 221 is plugged no air will be going through the output conduit, and all air will be going out the exhaust port 217 forcing the gate 219 upward so the flag is raised to the position 241B. Other indicators, such as indicators with a ball in a tube where the height of the ball indicates the air flow, could be used as well. The position of the gate 219 could also be monitored by sensors connected to a display at an operator's location.

In the illustrated apparatus 1, the ends of the bristles 11 are attached to a mounting block 23 that is releasably attached to the top wall 25 of the chamber 3 with screws 27 or the like such that the bristles 11 extend downward between the inlet port 5 and the exhaust port 17. The mounting block 23 can be removed and replaced when the bristles 11 become worn. It is contemplated that the block 23 with attached bristles 11 could possibly be removed and replaced through the exhaust port 17, or removable walls could be provided in the chamber 3 to provide the required access.

The bottom wall 29 slopes from the front wall 31 of the chamber 3 downward and rearward to the outlet port 9. The bristles 11 extend downward from the top wall 25 to a location above the bottom wall 29, such that particles 13 can slide along the bottom wall to the outlet port 9 without contacting the bristles 11. An alternate embodiment of the apparatus 101 is illustrated in FIG. 4, and shows the chamber 103, inlet port 105, outlet port 109, and bristles 111 in a different configuration where the chamber 103 slopes from the rear end to the front end to the outlet port 109 located generally below the inlet port. An exhaust port 117 could be placed in the chamber 103 opposite the inlet port 105, however even without an exhaust port 117 it is contemplated that particles entering the chamber 103 through the inlet port 105 at high speed will contact the bristles 111, and drop out of the air stream and then slide down the sloping chamber to the outlet port 109 and exit the chamber 103 with the air stream, but at a much reduced speed. Other configurations will be readily recognized by those skilled in the art.

Figure 6:
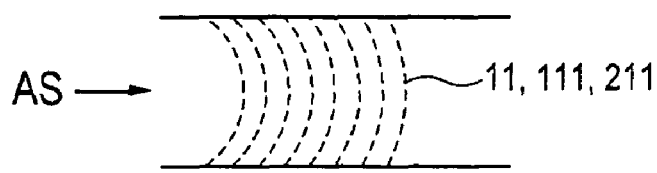
Figure 7:
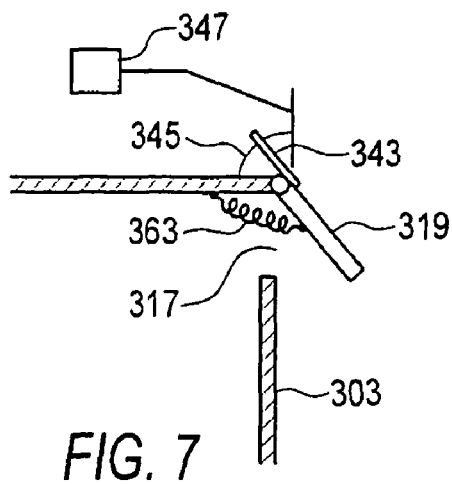
Figure 8:
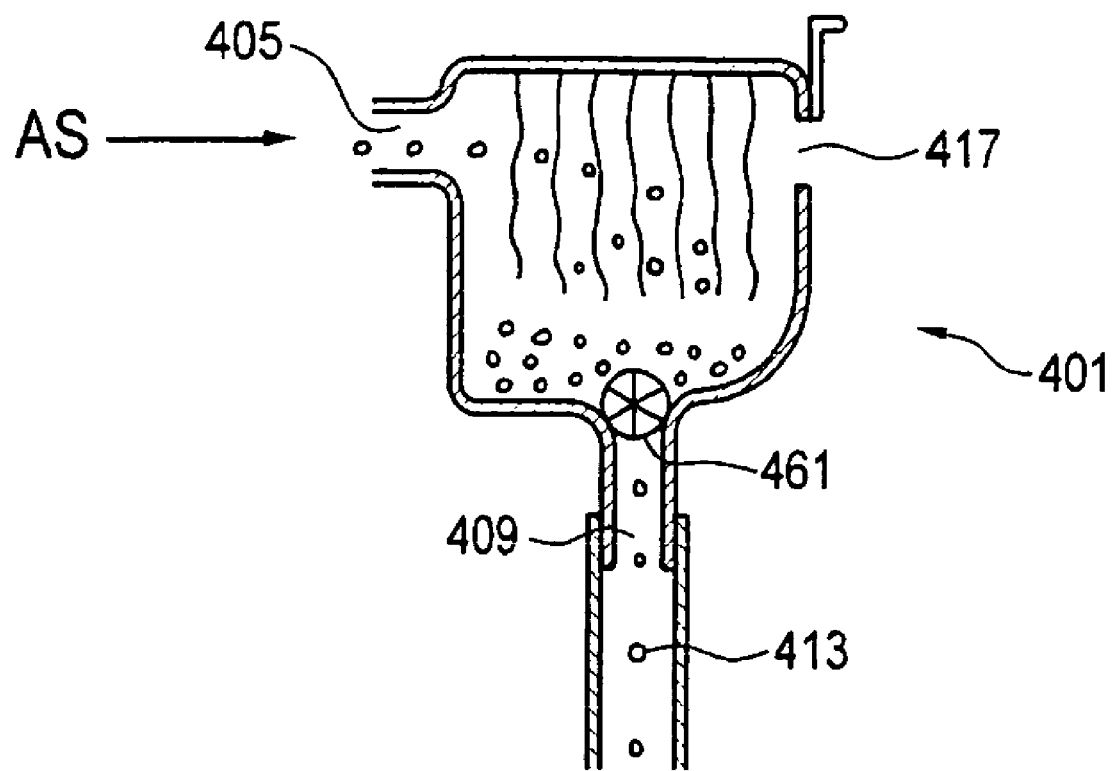

The illustrated apparatus 1 is configured such that front bristles 11A near the inlet port 5 are more flexible than rear bristles 11B farther from the inlet port 5. The illustrated bristles 11 generally increase in stiffness or rigidity from the front to the rear. Thus Smaller particles will be removed near the front and larger particles will contact more bristles before being slowed toward the rear of the chamber 3. The progression in stiffness causes the particles to slow gently reducing damage to sensitive seeds, while the stiffer bristles 11B reduce the risk that heavier seeds will pass through the bristles and contact the rigid rear wall where they could be damaged. Making the front bristles 11A more flexible also reduces the risk that particles 13 will bounce off the front bristles 11A and contact the walls of the chamber 3 at high speed. The more flexible brushes slow the particles 13 down gently. The bristles 11 could also be cupped, as schematically illustrated in FIG. 6, so that should particles in the air stream AS bounce off the first contacted bristles 11, 111, 211 they will more likely contact the bristles along the side than the walls of the chamber itself.

In an air seeder application smaller seeds like canola and flax will be stopped by the more flexible bristles 11A, while larger seeds are progressively slowed as they pass through the progressively more rigid bristles 11, and finally drop out.

FIG. 3 schematically illustrates the apparatus 1 in use in an air seeder. The chamber apparatus 1 is mounted above a furrow opener 35 of the air seeder, and the pneumatic conveyor conduit 7 connected to the inlet port 5 is a typical air conduit with an air stream carrying granules of agricultural products such as seed or fertilizer therethrough. The outlet port 9 is located such that particles 13 of agricultural products flowing out of the outlet port 9 are directed through the output conduit 21 to fall into a furrow 37 made by the furrow opener 35.

FIG. 7 illustrates an wherein an alternate embodiment for convenient use in an air seeder application. The exhaust port 317 is shown here in the rear wall of the chamber 303, and the gate position indicator is provided by a remote indicator visible to a remote observer. A gate pin 343 is attached to the gate 319 and as the gate moves up and down the position of the pin is read on a scale 345 and sent to a monitor 347 in the cab of a tractor towing the air seeder. The gate 319 is biased to the closed position by a spring 363.

FIG. 8 illustrates an alternate apparatus 401 for an air seeder application where the seeds being used are corn, for example. Seeders for such seeds typically include a singulator or metering mechanism operative to dispense seeds one at a time into the furrow, so that plant spacing is maintained at a desired regular distance. Seeds are carried by air to a chamber above the furrow and the metering mechanism dispenses the seeds from the chamber. The apparatus 401 therefore includes a chamber 403 with an inlet port 405 in the upper front area of the chamber 403 and an exhaust port 417 in the rear portion of the chamber 403, and bristles 411 hanging down between. Seeds 413 drop to the bottom of the chamber 403. A metering mechanism 461 in the bottom of the chamber 403 is operative to meter seeds 413 out of the chamber through the outlet port 409.

Thus the apparatus 1 slows the speed of particles 13 carried in an air stream AS in a pneumatic conveyor conduit 7 by directing the air stream AS into an inlet port 5 in the the chamber 3. A plurality of flexible bristles 11 is secured at ends thereof to the wall 25 of the chamber 3 such that the bristles 11 extend into the chamber such that particles carried in the air stream contact the bristles 11 and are slowed by the bristles 11 and drop to the bottom of the chamber 3, which is sloped so that particles 13 falling inside the chamber slide out of the chamber through the outlet port 9 at a much reduced speed, and can be directed to a desired location.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A chamber apparatus for reducing the speed of particles carried in a pneumatic conveyor conduit, the apparatus comprising:
    a chamber;
    an inlet port in the chamber, the inlet port adapted for attachment to the pneumatic conveyor conduit;
    an outlet port in a lower portion of the chamber;
    a plurality of flexible bristles secured at ends thereof to a wall of the chamber and extending into the chamber above a bottom of the chamber such that particles carried in an air stream entering the inlet port contact the bristles and fall to the bottom of the chamber under the bristles;
    wherein the chamber is configured such that particles falling inside the chamber move along the bottom of the chamber under the bristles out of the chamber through the outlet port.

2. The apparatus of claim 1 wherein the inlet port is defined in an upper front portion of the chamber and is adapted for attachment to the pneumatic conveyor conduit such that the air stream entering the inlet port is directed toward a rear portion of the chamber.

3. The apparatus of claim 2 further comprising an exhaust port defined in a rear portion of the chamber.

4. The apparatus of claim 3 wherein the bristles are attached at upper ends thereof to a top wall of the chamber, and hang downward between the inlet port and the exhaust port.

5. The apparatus of claim 4 wherein the chamber is sloped such that particles falling inside the chamber slide out of the chamber through the outlet port.

6. The apparatus of claim 5 wherein the bristles extend downward from the top wall to a location above a bottom wall such that a space is open between bottom ends of the bristles and the bottom of the chamber.

7. The apparatus of claim 3 comprising a gate operative to change a size of the exhaust port to control air flow therethrough.

8. The apparatus of claim 1 wherein ends of the bristles are attached to a mounting block, and wherein the mounting block is releasably attachable to the wall of the chamber.

9. The apparatus of claim 1 configured such that first bristles closer to the inlet port are more flexible than second bristles farther from the inlet port.

10. The apparatus of claim 1 comprising an exhaust port in a wall of the chamber, and a gate operative to change a size of the exhaust port to control air flow therethrough.

11. An air seeder air conduit apparatus comprising:
    a chamber according to claim 1;
    an air seeder air conduit connected to the inlet port such that an air stream carrying particles of agricultural products through the air conduit contacts the bristles and
    wherein the outlet port is located such that particles moving out of the outlet port are directed to fall into a furrow.

12. The apparatus of claim 11 wherein the inlet port is defined in an upper front portion of the chamber and is attached to the air seeder conduit such that the air stream entering the inlet port is directed toward a rear portion of the chamber, and further comprising an exhaust port defined in the rear portion of the chamber, and a gate operative to change a size of the exhaust port to control air flow therethrough.

13. The apparatus of claim 12 wherein the gate is pivotally attached to the chamber such that the air stream entering the chamber exerts a force on the gate to move the gate from a closed position toward a fully open position.

14. The apparatus of claim 13 further comprising an indicator connected to the gate to indicate a position of the gate between the closed and fully open positions.

15. The apparatus of claim 11 wherein ends of the bristles are attached to a mounting block, and wherein the mounting block is releasably attachable to a top wall of the chamber.

16. The apparatus of claim 11 configured such that first bristles closer to the inlet port are more flexible than second bristles farther from the inlet port.

17. The apparatus of claim 11 comprising a metering mechanism at a bottom portion of the chamber operative to meter particles out of the chamber through the outlet port.

* * * * *